United States Patent Office 3,732,226
Patented May 8, 1973

3,732,226
4-[(2 - CYANOETHYL)AMINO] - 2 - PHENYL-5-PYRIMIDINECARBOXYLIC ACID ESTERS
Arthur A. Santilli, Havertown, and Dong H. Kim, Wayne, Pa., assignors to American Home Products Corporation, New York, N.Y.
No Drawing. Original application Aug. 14, 1968, Ser. No. 752,485, now Patent No. 3,641,027, dated Feb. 8, 1972. Divided and this application Apr. 23, 1971, Ser. No. 136,670
Int. Cl. C07d 51/42
U.S. Cl. 260—256.4 N        6 Claims

ABSTRACT OF THE DISCLOSURE

The disclosure is directed to 5,6,7,8-tetrahydro-5-oxopyrido[2,3-d]pyrimidine-6-carbonitriles and to carboxylic-acid esters which are intermediates in their preparation. Both the final products and the intermediates have central nervous system activity as depressants.

This application is a division of our application Ser. No. 752,485 filed Aug. 14, 1968, which issued as Pat. 3,641,-027 on Feb. 8, 1972.

This invention relates to new and useful pyrimidine and pyrido[2,3-d]pyrimidine derivatives. More particularly, this invention relates to new and useful 5,6,7,8-tetrahydro-5-oxo-pyrido[2,3-d]pyrimidine-6-carbonitriles and intermediates in the preparation thereof.

The most closely related, known art is contained in an article by S. G. Cottis and H. Tieckelmann, J. Org. Chem. 26, 79 (1961). The compounds described in that article are fully aromatic and contain no 5-oxo group. The compounds of the present invention are distinguished from the prior art inter alia by the presence of the 5-oxo group.

Some of the compounds within the purview of the present invention are exemplified by those having the following formula:

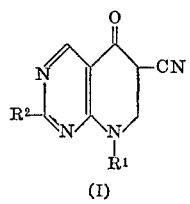

(I)

Where $R^1$ is selected from the class consisting of chlorobenzyl, ethyl morpholino, propyl morpholino, lower alkyl, phen (lower)alkyl, lower alkoxy (lower) alkyl, di (lower)alkylamino lower alkyl; and $R^2$ is a lower alkyl, phenyl, halophenyl, lower alkylphenyl, and lower alkoxyphenyl.

As used herein the terms "lower alkyl," "lower alkoxy," and the like describe groups containing from about 1 to about 4 carbon atoms.

Also within the purview of the present invention are compounds exemplified by the following formula, which, as is explained below, are intermediates in the preparation of the compounds having Structural Formula I:

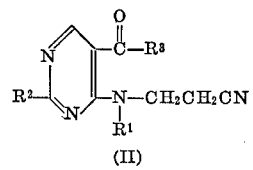

(II)

Where $R^1$ and $R^2$ are as defined above, and $R^3$ is methoxy or ethoxy.

Typical examples of the compounds of this invention which are depicted by Structural Formula I are 5,6,7,8-tetrahydro-5-oxo-8-phenethyl-2-phenylpyrido[2,3 - d]pyrimidine-6-carbonitrile and 8-(p-chlorobenzyl) - 5,6,7,8-tetrahydro-5-oxo-2-phenylpyrido[2,3-d]pyrimidine-6 - carbonitrile.

Typical examples of the compounds of this invention which are depicted by Structural Formula II are 4-(2-cyanoethyl) (phenethyl)amino]-2-phenyl - 5 - pyrimidine-carboxylic acid, ethyl ester and 4-[(2-cyanoethyl) (2-morpholinoethyl)amino]-2-phenyl - 5 - pyrimidinecarboxylic acid, ethyl ester.

The new and novel compounds of this invention may be prepared by the process which is hereinafter schematically illustrated:

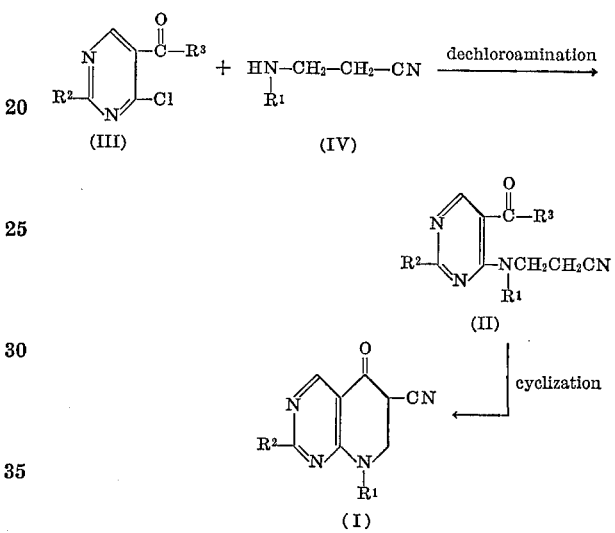

Where $R^1$, $R^2$ and $R^3$ are defined as above.

As will be understood by those skilled in the art, the compounds having Formula I may exist as tautomers of the structures shown.

The 5,6,7,8-tetrahydro-5-oxopyrido[2,3-d]pyrimidine-6-carbonitriles (I) of thin invention may be prepared by a two step process. In the first step a mixture of 5-carbalkoxy-4-chloropyrimidine (III) and 3-alkylaminopropionitrile (IV) in a reaction inert organic solvent, such as an alkanol or dimethylformamide, is heated with stirring at a temperature range from about 60 to about 150 degrees C. for a period of about 1 to 4 hours, affording the intermediate product 4[(2-cyanoethyl)alkylamino]-5-pyrimidine carboxylic acid esters (II). Preferably the reaction is carried out in ethanol, if $R^3$ is ethoxy, or in methanol if $R^3$ is methoxy, at the reflux temperature for about two hours, but time is not critical. Preferably an acid scavenger, such as sodium carbonate, is utilized to neutralize hydrochloric acid generated in the reaction.

The intermediates may be separated and purified by means well known in the art. For instance, when the reaction is complete, the product may be separated by standard recovery means, for example, removal of organic solvent by evaporation and treatment of the residue with water to remove any inorganic salt. The product may be purified by recrystallization from an organic solvent such as benzene-petroleum ether, cyclohexane, pentane and the like.

In the second step the new and novel intermediate product (II) is added to a solution of metallic sodium in an alkanol, methanol being used where $R^3$ is methoxy and ethanol being used where $R^3$ is ethoxy. While other metals may be used, as is known in the art, sodium and potassium are preferred because they will dissolve in the solvents used in the reaction and because they produce strong bases. The reaction mixture is heated at a temperature range of about 60 to 80 degrees C., preferably the reflux temperature, for a period of about ½ to 3 hours, preferably from about 1 to 2½ hours.

When the reaction is complete, the product may be recovered by well known means, for instance, the reaction mixture may be evaporated to dryness, the residue dissolved in water and the solution acidified to precipitate the product. The precipitate thus afforded may be recrystallized from a suitable solvent for instance from acetone and water, ethanol, 2-ethoxyethanol-water, or the like, affording the pure product, 5,6,7,8-tetrahydro-5-oxopyrido[2,3-d]pyrimidine-6-carbonitrile (I).

All of the 3-(substituted amino)propionitrile starting materials used in the practice of the present invention have been described in the literature except 3-(2-methoxyethylamino) propionitrile. The latter compound may be prepared by adding 15.9 grams of acrylonitrile, dropwise over a period of 90 minutes while maintaining the temperature below 30° C., to a solution of 33.6 grams of 2-methoxyethylamine in 200 milliliters of absolute ethanol. The reacton mixture is allowed to stand at room temperature for about four hours and then is heated to reflux for about one hour. The ethanol is removed by evaporation, and the residue is fractionally distilled, affording 33.8 grams of the desired starting material distilling at 94–96° C. at a pressure of 0.5 millimeter of mercury.

The new and novel 4-[(2-cyanoethyl)alkylamino]-5-pyrimidine carboxylic acid esters (II) of this invention are useful as intermediates in the preparation of the new and novel 5,6,7,8-tetrahydro-5-oxopyrido[2,3-d]pyrimidine-6-carbonitriles (I) of this invention. Both the intermediate compounds of Formula II and the products of Formula I are useful as central nervous system depressants. That is, they produce a calming effect in the host.

In the pharmacological evaluation of the biological activity of the compounds of this invention, the in vivo effects are tested as follows. The compound to be tested is administered orally or intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) autonomic activity (i.e., miosis, mydriasis, diarrhea) are noted.

If a compound demonstrates no activity following oral administration, the procedure is repeated following intraperitoneal administration.

The 5,6,7,8 - tetrahydro - 5 - oxopyrido[2,3-d]pyrimidine-6-carbonitriles (I) of this invention induce central nervous system depressant effects at 40 to 400 mg./kg. of host body weight when administered orally or at 12.7 to 40 mg./kg. when administered intraperitoneally.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions or they may be injected parenterally, that is, intra-muscularly, intravenously or subcutaneously.

For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

EXAMPLE 1

This example shows the preparation of 4-[(2-cyanoethyl)methylamino] - 2 - phenyl-5-pyrimidinecarboxylic acid, ethyl ester, a compound of structure (II).

A mixture of 2.6 grams (g.) of 5-carbethoxy-4-chloro-2-phenylpyrimidine, 0.9 g. of 3 - methylaminopropionitrile and 1.1 g. of sodium carbonate in 50 milliliters (ml.) of ethanol is heated with stirring under reflux for 2 hours. The reaction mixture is taken to dryness on a rotary evaporator. The residue is triturated with 50 ml. of water and filtered under suction. Recrystallization from benzene-petroleum ether afforded 1.5 g. of product having a melting point of 83–85° C.

Based on the formula $C_{17}H_{18}N_4O_2$, it is calculated that the elemental analysis by weight would be 65.79 percent carbon, 5.85 percent hydrogen and 18.05 percent nitrogen. The product is analysed and the content is found to be 65.74 percent carbon, 5.77 percent hydrogen, and 17.84 percent nitrogen. The foregoing may be expressed:

Analysis calculated for $C_{17}H_{18}N_4O_2$ (percent): C, 65.79; H, 5.85; N, 18.05. Found (percent): C, 65.74; H, 5.77; N, 17.84.

EXAMPLES II–III

Following the procedure of Example I, but substituting appropriate starting material the following products may be prepared:

(II)  4 - [(2 - cyanoethyl)ethylamino] - 2-(p-tolyl)-5-pyrimidinecarboxylic acid, methyl ester.
(III) 4 - [butyl(2 - cyanoethyl)amino] - 2 - methyl-5-pyrimidinecarboxylic acid, methyl ester.

EXAMPLE IV

This example shows the preparation of 4-[(2-cyanoethyl)(phenethyl)amino] - 2 - phenyl-5-pyrimidinecarboxylic acid, ethyl ester, a compound of structure (II).

Following the procedure of Example I, 4-[(2-cyanoethyl)(phenethyl)amino] - 2 - phenyl-5-pyrimidinecarboxylic acid, ethyl ester is prepared from 2.6 g. of 5-carbethoxy-4-chloro - 2 - phenylpyrimidine, 1.6 g. of 3-(phenethylamino)propionitrile, and 1.1 g. of sodium carbonate in 50 ml. of ethanol. Recrystallization from cyclohexane afforded 1.8 g. of product having a melting point of 67–70° C.

Analysis calculated for $C_{24}H_{24}N_4O_2$ (percent): C, 71.98; H, 6.04; N, 13.99. Found (percent): C, 72.16; H, 5.99; N, 14.21.

EXAMPLES V–VI

Following the procedure of Example I, but substituting appropriate starting materials, the following products are afforded:

(V) 2-(p-butylphenyl)-4-[(4-phenbutyl)(2-cyanoethyl) amino]-5-pyrimidinecarboxylic acid, methyl ester.
(VI) 2-butyl-4-[benzyl(2-cyanoethyl)amino]-5-pyrimidinecarboxylic acid, methyl ester.

EXAMPLE VII

The following example illustrates the preparation of 4-[(2-cyanoethyl)(2-morpholinoethyl)amino] - 2 - phenyl-5-pyrimidinecarboxylic acid, ethyl ester, a compound of structure (II).

Following the procedure of Example I, 4-[(2-cyanoethyl)(2-morpholinoethyl)amino] - 2 - phenyl-5-pyrimidinecarboxylic acid, ethyl ester is prepared from 2.6 g. of 5-carbethoxy-4-chloro-2-phenylpyrimidine, 1.8 g. of 3-(2 - morpholinoethylamino)propionitrile and 1.1 g. of sodium carbonate in 50 ml. of ethanol. The oily residue crystallizes on standing. Recrystallization from cyclohexane affords 2.1 g. of product having a melting point of 88–90° C.

Analysis calculated for $C_{22}H_{27}N_5O_3$ (percent): C, 64.53; H, 6.65; N, 17.10. Found (percent): C, 64.64; H, 6.78; N, 16.96.

EXAMPLE VIII

Following the procedure of Example I, but substituting an appropriate starting material, the following product is afforded:

(VIII) 4-[(2-cyanoethyl)(3-morpholinopropyl)amino]-2-(p-methoxyphenyl)-5-pyrimidinecarboxylic acid, methyl ester.

EXAMPLE IX

The following illustrates the preparation of 4-[(2-cyanoethyl)(2-methoxyethyl)amino] - 2 - phenylpyrimidine-5-carboxylic acid, ethyl ester.

Following the procedure of Example I, 4-[(2-cyanoethyl)(2 - methoxyethyl)amino] - 2 - phenylpyrimidine-5-carboxylic acid, ethyl ester is prepared from 2.6 g. of 5-carbethoxy-4-chloro-2-phenylpyrimidine, 1.3 g. of 3-(2-methoxyethylamino)propionitrile, and 1.1 g. of sodium carbonate in 50 ml. of ethanol. The oily residue crystallizes on standing. Recrystallization from petroleum ether affords 1.2 g. of product having a melting point of 45–47° C.

Analysis calculated for $C_{19}H_{22}N_4O_3$ (percent): C, 64.39; H, 6.26; N, 15.81. Found (percent): C, 64.24; H, 6.23; N, 15.70.

EXAMPLES X–XI

Following the procedure of Example I, but substituting appropriate starting materials, the following products are afforded:

(X) 2-(m-butoxyphenyl)-4-[(2-cyanoethyl)(4-ethoxybutyl)amino]-5-pyrimidinecarboxylic acid, ethyl ester.
(XI) 4-[(butoxyethyl)(2-cyanoethyl)amino]-2-(o-ethoxyphenyl)-5-pyrimidinecarboxylic acid, methyl ester.

EXAMPLE XII

The following illustrates the preparation of 4-[2-cyanoethyl)(2 - diethylaminoethyl)amino] - 2 - phenylpyrimidine-5-carboxylic acid, ethyl ester, a compound of structure (II).

Following the procedure of Example I, 4-[(2-cyanoethyl)(2 - diethylaminoethyl)amino]-2-phenylpyrimidine-5-carboxylic acid, ethyl ester is prepared from 2.6 g. of 5-carbethoxy-4-chloro-2-phenylpyrimidine, 1.6 g. of 3-(2-diethylaminoethylamino)propionitrile and 1.1 g. of sodium carbonate in 50 ml. of ethanol. The product is recrystallized from pentane giving a product having a melting point of 42–45° C.

Analysis calculated for $C_{22}H_{29}N_5O_2$ (percent): C, 66.81; H, 7.39; N, 17.71. Found (percent): C, 66.95; H, 7.48; N, 17.41.

EXAMPLES XIII–XIV

Following the procedure of Example I, but substituting appropriate starting materials, the following products are afforded:

(XIII) 4-[(2-cyanoethyl)(4-dimethylaminobutyl) amino]-2-ethylpyridine-5-carboxylic acid, methyl ester.
(XIV) 4-[(2-cyanoethyl(3-dimethylaminopropylamino)]-2-(p-tolyl)pyrimidine-5-carboxylic acid, ethyl ester.

EXAMPLE XV

The following illustrates the preparation of 4-[p-chlorobenzyl-(2-cyanoethyl)amino] - 2 - phenylpyrimidine-5-carboxylic acid, ethyl ester.

Following the procedure of Example I, 4-[p-chlorobenzyl-(2 - cyanoethyl)amino] - 2 - phenylpyrimidine-5-carboxylic acid, ethyl ester is prepared from 2.6 g. of 5-carbethoxy-4-chloro-2-phenylpyrimidine, 1.9 g. of 3-(p-chlorobenzylamino)propionitrile and 1.1 g. of sodium carbonate in 50 ml. of ethanol. The product when recrystallized from cyclohexane-petroleum ether has a melting point of 93–95° C.

Analysis calculated for $C_{23}H_{21}ClN_4O_2$ (percent): C, 65.63; H, 5.03; Cl, 8.42; N, 13.31. Found (percent): C, 65.32; H, 5.11; Cl, 8.55; N, 13.19.

EXAMPLES XVI–XVIII

Following the procedure of Example I, but substituting appropriate starting materials, the following products are afforded:

(XVI) 4-[m-chlorobenzyl(2-cyanoethyl)amino]-2-(m-chlorophenyl)pyrimidine-5-carboxylic acid, methyl ester.
(XVII) 4-[o-chlorobenzyl(2-cyanoethyl)amino]-2-(p-iodophenyl)pyrimidine-5-carboxylic acid, ethyl ester.
(XVIII) 4-[p-chlorobenzyl(2-cyanoethyl)amino]-2-(o-fluorophenyl)pyrimidine-5-carboxylic acid, methyl ester.

EXAMPLE XIX

This example illustrates the preparation of 5,6,7,8-tetrahydro-8-methyl-5-oxo-2 - phenylpyrido[2,3-d]pyrimidine-6-carbonitrile, a compound of structure (I).

To a solution of 0.1 g. of sodium in 50 ml. of ethanol there is added 1 g. of 4-[(2-cyanoethyl)methylamino]-2-phenyl-5-pyrimidinecarboxylic acid, ethyl ester. The reaction mixture is heated under reflux for 1 hour. The reaction mixture is cooled in ice and the precipitate which deposits is collected on a filter. This material is dissolved in 50 ml. of water, and the solution is made acidic with 20 percent acetic acid solution. A yellow material precipitates out of solution. Upon recrystallization from ethanol 0.3 g. of product is obtained having a melting point of 218–220° C.

Analysis calculated for $C_{15}H_{15}N_4O$ (percent): C, 68.17; H, 4.58; N, 21.20. Found (percent): C, 68.41; H, 4.51; N, 21.30.

EXAMPLES XX–XXI

Following the procedure of Example XIX but substituting appropriate starting materials, the following products are afforded:

(XX) 8-ethyl-5,6,7,8-tetrahydro-2-(p-tolyl)-5-oxo-pyrido[2,3-d]pyrimidine-6-carbonitrile.
(XXI) 8-butyl-5,6,7,8-tetrahydro-2-methyl-5-oxo-pyrido[2,3-d]pyrimidine-6-carbonitrile.

EXAMPLE XXII

This example illustrates the preparation of 5,6,7,8-tetrahydro-5-oxo-8-phenethyl - 2 - phenylpyrido[2,3-d]pyrimidine-6-carbonitrile, a compound of structure (I).

To a solution of 0.23 g. of sodium in 100 ml. of ethanol is added 4.1 g. of 4-[(2-cyanoethyl)(phenethyl)amino]-2-phenyl-5-pyrimidinecarboxylic acid, ethyl ester. The reaction mixture is heated under reflux for 2.5 hours, then evaporated to dryness in a rotary evaporator. The residue is dissolved in 50 ml. of hot water and the solution is acidified with 3 normal (3 N) acetic acid to pH 6. The precipitate thus afforded is recrystallized from acetone-water giving 2.7 g. of product having a melting point of 199–202° C.

Analysis calculated for $C_{22}H_{18}N_4O$ (percent): C, 74.55; H, 5.12; N, 15.81. Found (percent): C, 74.57; H, 5.09; N, 15.51.

EXAMPLES XXIII–XXIV

Following the procedure of Example XXII but substituting an appropriate starting material, the following products are afforded:

(XXIII) 2-(p-butylphenyl)-5,6,7,8-tetrahydro-5-oxo-8-(4-phenbutyl)-pyrido[2,3-d]pyrimidine-6-carbonitrile.

(XXIV) 8-benzyl-2-(p-butylphenyl)-5,6,7,8-tetrahydro-5-oxo-pyrido[2,3-d]pyrimidine-6-carbonitrile.

EXAMPLE XXV

The following illustrates the preparation of 5,6,7,8-tetrahydro-8-(2-morpholinoethyl)-5-oxo - 2 - phenylpyrido[2,3-d]pyrimidine-6-carbonitrile, a compound of structure (I).

Following the procedure of Example XXII, 5,6,7,8-tetrahydro-8-(2-morpholinoethyl)-5-oxo - 2-phenylpyrido-[2,3-d]pyrimidine-6-carbonitrile is prepared from 6.5 g. of 4-[(2-cyanoethyl)(2-morpholinoethyl)amino]-2-phenyl-5-pyrimidinecarboxylic acid, ethyl ester in 50 ml. of ethanol containing 0.35 g. of sodium. After recrystallization from 2-ethoxyethanol-water, the product is obtained having a melting point of 107–109° C.

Analysis calculated for $C_{20}H_{21}N_5O_2$ (percent): C, 66.10; H, 5.82; N, 19.27. Found (percent): C, 66.17; H, 5.61; N, 19.08.

EXAMPLES XXVI–XXIX

Following the procedure of Example XXII but substituting appropriate starting materials, the following products are afforded:

(XXVI) 5,6,7,8-tetrahydro-2-(p-methoxyphenyl)-8-(3-morpholinopropyl)-5-oxopyrido[2,3-d]pyrimidine-6-carbonitrile.

(XXVII) 8-(2-diethylaminoethyl)-5,6,7,8-tetrahydro-5-oxo-2-phenylpyrido[2,3-d]pyrimidine-6-carbonitrile.

(XXVIII) 2-ethyl-5,6,7,8-tetrahydro-8-(4-dimethylaminobutyl)-5-oxopyrido[2,3-d]pyrimidine-6-carbonitrile.

(XXIX) 5,6,7,8-tetrahydro-8-(3-dimethylaminopropyl)-2-(p-tolyl)-5-oxopyrido[2,3-d]pyrimidine-6-carbonitrile.

EXAMPLE XXX

The following illustrates the preparation of 5,6,7,8-tetrahydro - 8 - (2-methoxyethyl)-5-oxo-2-phenylpyrido-[2,3-d]pyrimidine-6-carbonitrile, a compound of structure (I).

Following the procedure of Example XXII, 5,6,7,8-tetrahydro - 8 - (2 - methoxyethyl)-5-oxo-2-phenylpyrido-[2,3-d]pyrimidine-6-carbonitrile is prepared from 6.5 g. of 4-[(2-cyanoethyl)(2-methoxyethyl)amino] - 2 - phenylpyrimidine-5-carboxylic acid, ethyl ester in 50 ml. of ethanol containing 0.46 g. of sodium. During the 2.5 hour reflux period a solid separates. This material is dissolved in 50 ml. water and the aqueous solution is made acidic with 3 N acetic acid solution. The product which deposits out of solution is separated by filtration. Recrystallization from ethanol affords 4.3 g. of product having a melting point of 172–174° C.

Analysis calculated for $C_{17}H_{16}N_4O_2$ (percent): C, 66.22; H, 5.23; N, 18.17. Found (percent): C, 66.42; H, 5.39; N, 18.08.

EXAMPLES XXXI–XXXII

Following the procedure of Example XXII, but substituting an appropriate starting material, the following products are afforded:

(XXXI) 2-(m-butoxyphenyl)-8-(2-methoxyethyl)-5,6,7,8-tetrahydro-5-oxopyrido[2,3-d]pyrimidine-6-carbonitrile.

(XXXII) 8-(butoxyethyl)-2-(o-ethoxyphenyl)-5,6,7,8-tetrahydro-5-oxopyrido[2,3-d]pyrimidine-6-carbonitrile.

EXAMPLE XXXIII

The following illustrates the preparation of 8-(p-chlorobenzyl)-5,6,7,8-tetrahydro - 5 5- oxo - 2 - phenylpyrido-[2,3-d]pyrimidine-6-carbonitrile, a compound of structure (I).

Following the procedure of Example XXII, 8-(p-chlorobenzyl)-5,6,7,8-tetrahydro - 5 - oxo - 2 - phenylpyrido-[2,3-d]pyrimidine-6-carbonitrile is prepared from 7.1 g. of 4-[p-chlorobenzyl(2-cyanoethyl)amino] - 2 - phenyl-5-pyrimidinecarboxylic acid, ethyl ester in 50 ml. of ethanol containing 0.39 g. of sodium. Recrystallization of the crude product affords 3.2 g. of pure product, having a melting point of 225–227° C.

Analysis calculated for $C_{21}H_{15}ClN_4O$ (percent): C, 67.29; H, 4.03; Cl, 9.46; N, 14.95. Found (percent): C, 67.11; H, 3.98; Cl, 9.75; N, 14.74.

EXAMPLES XXXIV–XXXVI

Following the procedure of Example XXII but substituting appropriate starting materials, the following products are afforded:

(XXXIV) 8-(m-chlorobenzyl)-2-(m-chlorophenyl)-5,6,7,8-tetrahydro-5-oxopyrido[2,3-d]pyrimidine-6-carbonitrile.

(XXXV) 8-(o-chlorobenzyl)-5,6,7,8-tetrahydro-2-(p-iodophenyl)-5-oxopyrido[2,3-d]pyrimidine-6-carbonitrile.

(XXXVI) 8-(p-chlorobenzyl)-2-(o-fluorophenyl)-5,6,7,8-tetrahydro-5-oxopyrido[2,3-d]pyrimidine-6-carbonitrile.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A compound selected from the group having the structural formula:

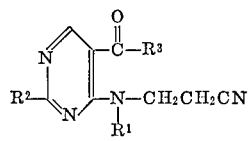

where $R^1$ is selected from the class consisting of chlorobenzyl, lower alkyl, phenloweralkyl, lower alkoxy(lower)alkyl and di-(lower)alkylamino(lower)alkyl;

$R^2$ is lower alkyl, phenyl, halophenyl, lower alkyl phenyl, or lower alkoxyphenyl; and $R^3$ is methoxy or ethoxy.

2. A compound as defined in claim 1 which is 4-[(2-cyanoethyl)methylamino] - 2 - phenyl - 5 - pyrimidinecarboxylic acid, ethyl ester.

3. A compound as defined in claim 1 which is 4-[(2-cyanoethyl(phenethyl)amino]-2-phenyl - 5 - pyrimidinecarboxylic acid, ethyl ester.

4. A compound as defined in claim 1 which is 4-[(2-cyanoethyl)(2-methoxyethyl)amino] - 2 - phenylpyrimidine-5-carboxylic acid, ethyl ester.

5. A compound as defined in claim 1 which is 4-[(2-cyanoethyl)(2-diethylaminoethyl)amino] - 2 - phenylpyrimidine-5-carboxylic acid, ethyl ester.

6. A compound as defined in claim 1 which is 4-[p-chlorobenzyl(2-cyanoethyl)amino]-2-phenyl - 5 - pyrimidinecarboxylic acid, ethyl ester.

References Cited

UNITED STATES PATENTS 3,641,027   2/1972   Santilli et al. _____ 260—256.4

ALEX MAZEL, Primary Examiner

R. V. RUSH, Assistant Examiner